United States Patent [19]

Carman

[11] Patent Number: 4,925,155
[45] Date of Patent: May 15, 1990

[54] CONTROL VALVE AND METHOD OF CONTROLLING MATERIAL FLOW THROUGH A CONDUIT

[75] Inventor: Charles H. Carman, Lake Forest, Ill.

[73] Assignee: Crane Electronics, Inc., Moline, Ill.

[21] Appl. No.: 219,097

[22] Filed: Jul. 14, 1988

[51] Int. Cl.⁵ ............................................. F16K 31/02
[52] U.S. Cl. .................. 251/117; 251/129.07; 251/129.22
[58] Field of Search .............. 251/117, 129.07, 129.16, 251/129.22; 137/629

[56] References Cited

U.S. PATENT DOCUMENTS

| | | | |
|---|---|---|---|
| 2,306,904 | 12/1942 | Ray | 137/629 X |
| 2,910,249 | 10/1959 | Gunkel | 239/548 |
| 2,922,614 | 1/1960 | Nickells | 251/54 |
| 3,256,900 | 6/1966 | Estes et al. | 137/88 |
| 4,573,441 | 3/1986 | Wietschorke et al. | 251/117 X |
| 4,632,358 | 12/1986 | Orth et al. | 251/117 |

*Primary Examiner*—John Fox
*Attorney, Agent, or Firm*—Albert J. Brunett

[57] ABSTRACT

A device and method for regulating the flow of material through a conduit. The device includes a material flow path having a disk member for closing the material flow path, a material bleed path through the disk member when closed and a member for moving the disk and opening the material flow path. The device can further include an additional piston member for closing the material flow path at a secondary position and having an additional material bleed path therethrough and an additional member for moving the piston and opening the flow path as well as a sleeve member movable within the device for releasing material pressure from both within the device and ahead of the device.

7 Claims, 3 Drawing Sheets

CONTROL VALVE AND METHOD OF CONTROLLING MATERIAL FLOW THROUGH A CONDUIT

BACKGROUND OF THE INVENTION

1. Field of the Invention

This invention relates generally to a device and method for controlling the flow of material through a conduit. More specifically, the invention relates to a control valve that cuts off the flow of air to a pneumatic tool and a method of using the same.

2. Description of the Related Art

Control valves and similar devices have been used for cutting off and regulating the flow of material through a conduit. For example, it is known to provide a control valve at a desired position along a conduit that has a flow of liquid, gas, or other flowable material therethrough. Normally, these control valves are utilized to begin the flow of material, slop the flow of material, or maintain the flow of material through the conduit at a desired rate. Typically, the control valves are either manually or automatically activated and can be completely mechanical in design, electrical in design or can be designed with a combination of electrical and mechanical components.

Such control valves are frequently used to regulate the flow of compressed air. Compressed air is not only used to drive power tools such as drills, jackhammers, and similar pneumatic tools, but it is used in a variety of other areas including inflating articles, cleaning articles, and in pneumatic conveying. Accordingly, compressed air has been employed as a source of power in a variety of settings.

Compressed air is also used extensively to power pneumatic tools in manufacturing. These pneumatic tools are typically supplied compressed air from an air compressor through a conduit, such as a pipe or hose. Frequently, the compressor is positioned in a fixed location and a system of compressed air supply lines is set up around the work place or factory. The pneumatic tools are then hooked up to the system at desired positions to enable a worker to use a pneumatic tool at a specific location. Normally, in operation, each pneumatic tool is constantly supplied air from the compressor. An operator controls the operation of the pneumatic tool by pulling a trigger or similar actuating device to allow compressed air to flow to and drive the tool.

When pneumatic tools are used in manufacturing, it is common to prescribe performance or quality specifications when assembling a particular part or piece of equipment. For example, when either a screw or bolt is to be tightened, it is important that the screw or bolt is tightened to a specific degree so that it is neither too loose nor too tight. Therefore, manufacturers frequently specify a desired rotational tightening force or torque to be employed on a particular item that is being assembled. Since these torque specifications are difficult for an operator to achieve with a manual tool, power tools, including pneumatic tools, are normally employed to achieve the desired torque specifications.

In order to obtain a desired torque with a pneumatic tool, a shut off or control valve is normally employed to automatically shut off the flow of air to the pneumatic tool upon reaching a certain torque. The torque can be measured by the pneumatic tool itself or by a separate device in communication with the pneumatic tool. In either event, upon attaining the desired torque, a signal is generated and transmitted either directly to the control valve or to a central control unit that in turn activates the control valve to shut off the supply of compressed air and stop the pneumatic tool. Of course, it can also be desirable to control other pneumatic tool outputs with a control valve other than the torque of a rotational pneumatic tool.

Control valves that are used to shut off the flow of compressed air to a pneumatic tool normally employ a solenoid type mechanism. The solenoid mechanism receives a signal from the pneumatic tool or a central control unit that energizes or de-energizes the solenoid mechanism to open or close the valve accordingly. These control valves typically have a valve seat that is sealed by a spring loaded solenoid plunger member in its at-rest position to prevent air flow through the control valve. To initiate air flow through the control valve, the spring loaded solenoid plunger member is moved away from the valve seat against the force of the spring by the solenoid's electromagnet that is energized by the signal.

Frequently, the forward flow of compressed air through the solenoid type control valve to the pneumatic tool combines with the force exerted by the spring to provide an additional force to hold the spring loaded solenoid plunger member against the valve seat. Consequently, to open the valve, the solenoid's electromagnet must be powerful enough to move the spring loaded solenoid plunger member against both the force of the spring and the force of the forward air pressure. Electromagnets having this power capacity are frequently to large for many environments and usually require a larger power input in order to be activated.

Additionally, in practice, the control valve is sometimes positioned along the length of the conduit at a distance from the pneumatic tool. This is especially true when a multi-spindle pneumatic tool is being used where there is no room for the valve near the tool itself. The main problem that exists with this type of pneumatic tool is that after the control valve shuts off the air flow, air remains in the line between the valve and the tool. Accordingly, due to the remaining air, the tool continues to operate after the control valve is shut off. This condition is completely undesirable since it prevents a precise shut down of the pneumatic tool and a particular, exact torque specification from being achieved.

Accordingly, there is a need for an improved control valve that is simple and compact in design, efficient to operate and can provide a complete, immediate shut down of a tool regardless of its position in the system.

SUMMARY OF THE INVENTION

The above and other disadvantages of the prior art are overcome in accordance with the present invention by providing a device and method for regulating the flow of material through a conduit that efficiently shuts off the flow of material at a precise point in time. To this end, the present invention provides a control valve device having a material flow path therethrough. The control valve device includes a disk member for closing the material flow path within the control valve device, a material bleed path through the disk member to bleed a slight amount of material through the valve and a member for opening the material flow path within the control valve device.

In another embodiment of the present invention, a control valve member is provided having a material flow path therethrough. The control valve includes a disk member for closing the material flow path through the valve at a first point in the valve, a sleeve member movable within the device for releasing material pressure existing ahead of the first point at a second point in the valve, and a piston member for closing the material flow path at a third point in the valve before the first point. The control valve also includes a bleed path for bleeding material through the disk member ahead of the disk member to be released at the second point, a member for opening the material flow path at the first point after the material pressure on both sides of the disk member is substantially equalized, a bleed path for bleeding material through the piston member at the third point, a first spring member for closing the sleeve member at the second point and a second spring member for opening the material flow path at the third point after the material pressure on both sides of the piston member is substantially equalized to open the flow path through the valve member.

DETAILED DESCRIPTION OF THE PREFERRED EMBODIMENTS

The present invention provides a device and method for controlling the flow of material through a conduit. As used herein, the term "material" includes a liquid, gas, or any other flowable material. As used herein, the term "conduit" includes a pipe, hose or any other material conveying device.

Figure 1:
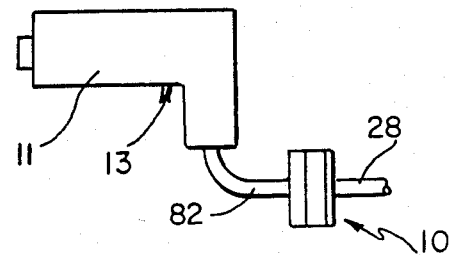
FIG. 1 illustrates a perspective view of a pneumatic tool coupled with the device of the present invention.

Referring now to FIG. 1, an embodiment of the material flow control device of the present invention is generally indicated by reference numeral 10. The device 10 is used to control the supply of compressed air to a tool, such as, for example, a pneumatic tool 11. It is to be understood, however, that the device 10 of the present invention can be used in a variety of applications to control a variety of devices and materials without departing from the spirit and scope of the present invention.

Figure 2:
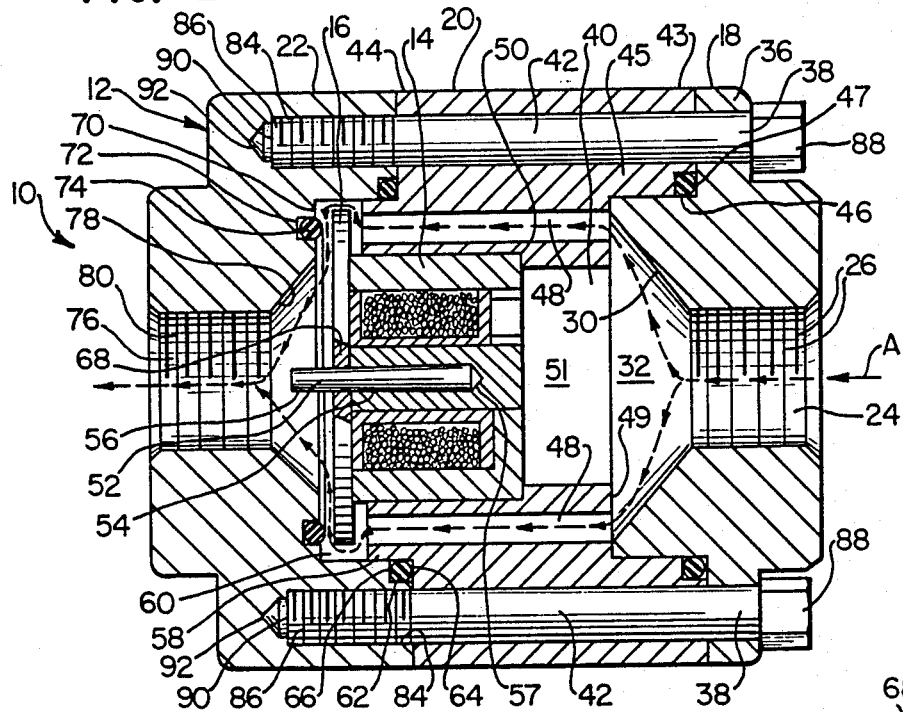
FIG. 2 illustrates a cross-sectional view of the device of FIG. 1 with the device in its opened position.
Figure 3:
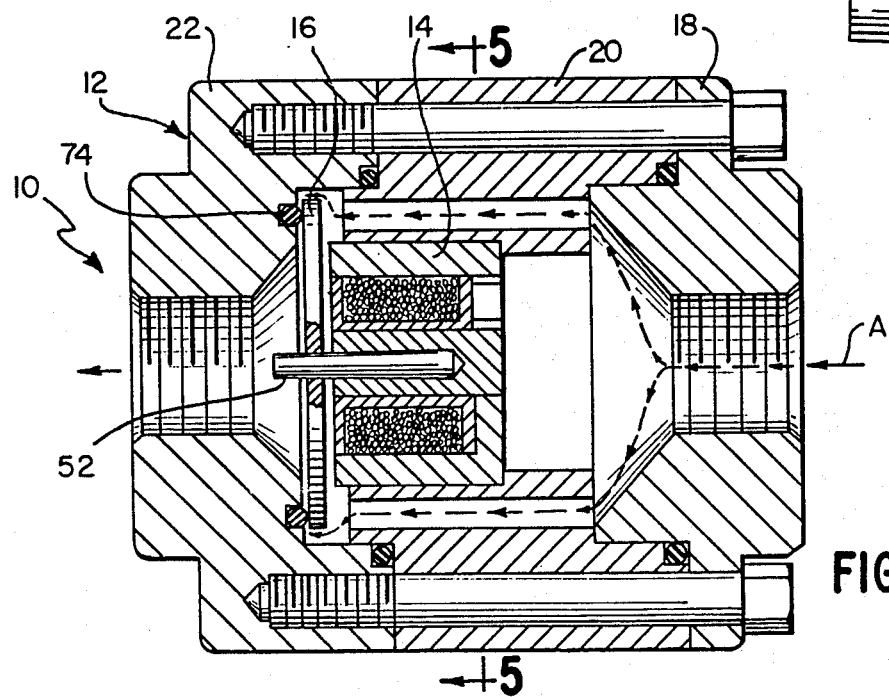
FIG. 3 illustrates a cross-sectional view of the device of FIG. 1 with the device in its closed position.

As FIGS. 2 and 3 illustrate, the device 10 includes a housing 12 having an electromagnet 14 and a disk member 16. Preferably, the housing 12 is circular in cross section and, in this embodiment, is cylindrical in shape.

Briefly, in operation, the device 10 has a compressed air flow path through its interior designated by arrow A. The flow path is opened or closed by the disk member 16. The disk member 16 moves longitudinally within the housing 12 from a first open position against the electromagnet 14, as FIG. 2 illustrates, where compressed air can flow through the housing 12, to a second closed position away from the electromagnet 14, as FIG. 3 illustrates, to seal off the flow of compressed air through the housing 12 and shut down the pneumatic tool 11.

The disk 16 is held in its first position by the electromagnet 14 against the flow of compressed air through the housing 12 that contacts the outer periphery of the disk 16. When the electromagnet 14 is de-energized, pressure generated by the compressed air flow forces the disk 16 to its second position.

At this point an operator typically releases a trigger 13 of the pneumatic tool 11 to close off the flow path ahead of the device 10. Thereafter, air pressure built up on the inlet side of the disk 16 can bleed through a central aperture in the disk 16 After the air pressure is substantially equalized on both sides of the disk 16, the electromagnet 14 is energized to move the disk 16 to its first position with virtually no resistance from the compressed air flow. The pneumatic tool 11 is now ready for operation.

A detailed description of the structure and operation of the device 10 will now be provided with specific reference to FIG. 2.

The housing 12 consists of three sections: an inlet section 18; a central section 20; and an outlet section 22. The sections 18, 20, and 22 are circular in cross-section and can be made of a variety of materials. Preferably, the three sections 18, 20, and 22 are made of metal. The securing and sealing of the three sections 18, 20, and 22 is accomplished by use of longitudinal fasteners and o-rings and will be explained in detail hereinafter.

The inlet section 18 of the housing 12 has a central inlet aperture 24. The inlet aperture 24 can be threaded with threads 26 in order to threadingly engage with threads (not shown) of an inlet conduit 28 illustrated in FIG. 1. The inlet aperture 24 accepts the flow of compressed air from the inlet conduit 28 and passes it through the inlet section 18 to the central section 20.

As FIG. 2 illustrates, the central inlet aperture 24 has an interior beveled surface 30 that is beveled toward the interior of the housing 12 to form a nozzle portion 32. When assembled, the nozzle portion 32 extends into the interior of the central portion 20.

An outwardly extending flange 36 is formed around the outside perimeter of the inlet section 18. Positioned around the flange 36 are a plurality of apertures 38 that extend through the flange 36 The apertures 38 are used for securing the three sections 18, 20, and 22 together as will be explained later. Preferably, four apertures 38 are positioned around the flange 36 and are approximately 90° apart. The number, size, and position of the apertures 38, however, can vary.

The central section 20 has a large central aperture 40 and a plurality of small apertures 42 positioned around its periphery. The large central aperture 40 houses the electromagnet 14. The small apertures 42 extend through the central section 20 and are utilized to secure the three sections 18, 20, and 22 together. In this embodiment, as FIG. 5 illustrates, four apertures 42 are used that line up with the apertures 38 in the flange 36 of the inlet section 18 when the inlet section 18 and central section 20 are assembled.

The central section 20 has a first longitudinal inlet end 43 and a second longitudinal outlet end 44. The interior of the central section 20 is defined by the large central aperture 40 and has a slightly enlarged diameter portion 45 near its inlet end 43 that accepts the nozzle portion 32 of the inlet section 18.

To provide a seal between the inlet section 18 and central section 20, an annular seat or shoulder 46 is formed within the enlarged diameter portion 45 of the large central aperture 40 near the inlet end 43 of the central section 20. An o-ring 47 is positioned within the annular seat 46. Accordingly, when assembled, the o-ring 47 seals against a bottom surface of the flange 36 of the inlet section 18 to seal the central section 20 with respect to the inlet section 18.

Figure 5:
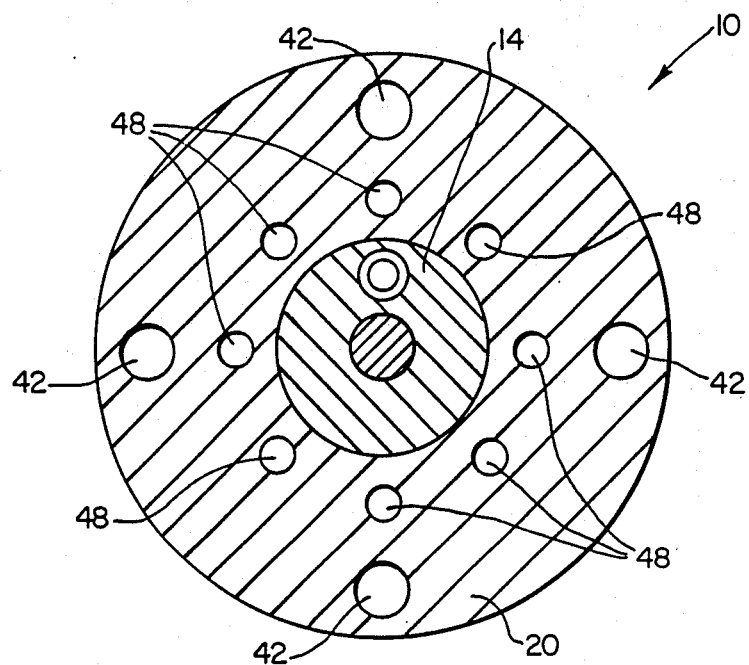
FIG. 5 illustrates a lateral cross-sectional view of the device of the present invention taken along lines 5—5 of FIG. 3.

As FIGS. 2 and 5 illustrate, to provide a material flow path through the central section 20, a plurality of through apertures 48 are spaced around a shoulder 49 formed within the large central aperture 40 at the internal end of the enlarged diameter portion 45. The apertures 48 extend longitudinally through the central section 20 and can vary in number and size. The apertures 48 accept material flow directly from the beveled surface 30 of the nozzle portion 32 of the inlet section 18 as illustrated by the material flow arrow A in FIG. 2. When the inlet section 18 and outlet section 20 are assembled, the outermost portion of the nozzle portion 32 of the inlet section 18 lies proximate the shoulder 49 of the central section 20.

The large central aperture 40 of the central section 20 is fitted with the electromagnet 14. The electromagnet 14 is connected to an external control (not shown) through wiring (not shown) that extends through the central section 20 of the housing 12. The electromagnet 14 is shouldered against an interior flange or shoulder 50 formed on the interior surface of the large central aperture 40 of the central portion 20. When the electromagnet 14 is secured within the large central aperture 40, it prevents material flow through the large central aperture 40 and directs it to the through apertures 48.

To secure the electromagnet 14 within the large central aperture 40 and to provide an effective seal against material flow, the electromagnet 14 can be encapsulated such as, for example, with an epoxy resin 51 or similar adhesive. The resin 51 can fill up the remaining portion of the large central aperture 40 between the electromagnet 14 and the shoulder 49 to prevent material flow into the large central aperture 40 altogether. Additionally, any necessary electrical components (not shown) can be positioned within the remaining portion of the large central aperture 40 and also can be encapsulated with the resin 51. As FIG. 2 illustrates, to enable contact between the electromagnet 14 and the disk 16, the electromagnet 14 protrudes slightly from the outlet end 44 of the central section 20 facing the outlet section 22.

To center the disk 16 within the housing 12 and assist its longitudinal movement within the housing 12, an elongated rod or pin 52 is secured within a central channel 54 formed in the protruding end of the electromagnet 14. The pin 52 has a distal end 56 that extends outwardly from the electromagnet 14 toward the side of the electromagnet 14 facing the outlet section 22. A proximal end 57 of the pin 52 can be secured within the central channel 54 of the electromagnet 14 by an adhesive or the like. The pin 52 can be slightly tapered, having its smallest diameter at its distal end 56.

The outlet end 44 of the central section 20 has a reduced outside diameter portion 58 formed around its exterior surface. The reduced diameter portion 58 extends into a recess 60, formed in the outlet section 22, when the two sections 20 and 22 are assembled.

To provide a seal between the central section 20 and the outlet section 22, an o-ring 62 is positioned so that it encircles the reduced diameter portion 58 of the central section 20. When the two sections 20 and 22 are assembled, the o-ring 62 lies between a shoulder or flange 64 formed by the reduced diameter portion 58 of the central section 20 and a recess or shoulder 66 formed in the outlet section 22 to provide the desired seal.

The disk 16 is positioned within the recess 60 of the outlet section 22 proximate the protruding end of the electromagnet 14. The disk 16 can move longitudinally within the recess 60 to open and close the flow path accordingly. Preferably, so the disk 16 can be attracted by the electromagnet 14 to open the flow path, the disk 16 is formed from a ferromagnetic material. The disk 16 has a central aperture 68 that can accept the pin 52. As the disk 16 moves longitudinally within the recess 60, it moves along the pin 52 which helps to guide the disk 16.

Figure 4:
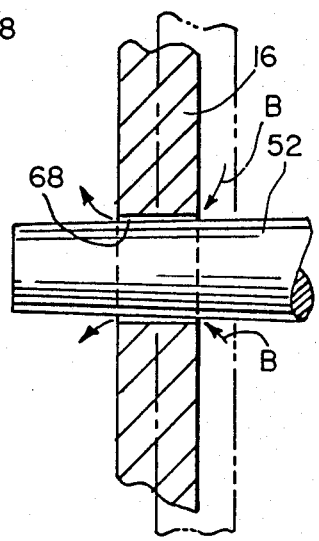
FIG. 4 illustrates an enlarged cross-sectional view of the device of the present invention illustrating the tapered pin and disk in detail.

As FIG. 4 illustrates, preferably, to allow compressed air to bleed through the disk 16 in its closed position, the central aperture 68 of the disk 16 is slightly larger than the diameter of the pin 52. Accordingly, a bleed path, designated by arrow B, is formed through the disk 16.

It is to be noted that when the disk 16 is in its first opened position against the electromagnet 14, as illustrated in FIG. 2, only a small area of the disk 16 around the outer periphery of the disk 16 is directly exposed to the material flow path, as illustrated by arrow A. However, when the disk 16 begins to move away from the electromagnet 14, to the second closed position as illustrated in FIG. 3, the material can contact a greater surface area on the disk 16 to increase its speed across the recess 60 of the outlet section 22.

As FIG. 2 illustrates, to form the interior end or bottom of the recess 60, the outlet portion 22 of the housing 12 is formed with an interior annular seat or shoulder 70. The other side of the recess 60 is formed by the electromagnet 14 and the outlet end 44 of the central section 20. The shoulder 70 has an annular recess 72 that is fitted with an o-ring 74. Accordingly, to stop the flow of compressed air through the device 10, the disk 16 can be moved along the pin 52 away from the electromagnet 14 within the recess 60 to a position against the o-ring 74.

To provide a compressed air flow path through the outlet section 22, the outlet section 22 is formed with a central outlet aperture 76. The central outlet aperture 76 has a beveled surface 78, similar to the beveled surface 30 of the central inlet aperture 24. The beveled surface 78 terminates at one end at the interior seat or shoulder 70 of the outlet section 22 and at its other end at the central outlet aperture 76.

The central outlet aperture 76 of the outlet section 22 can be internally threaded with threads 80. As FIG. 1 illustrates, an outlet conduit 82 having threads (not shown) can engage the threads 80 of the central outlet aperture 76 to secure the outlet conduit 82 to the apparatus 10.

To secure the outlet section 22 to the central section 20, the outlet section 22 has a plurality of apertures 84 positioned around its periphery. The apertures 84 extend into the outlet section 22 a predetermined distance from the interior side of the outlet section 22. In this embodiment, four apertures 84, having threads 86, are formed and line up with the apertures 38 and 42 of the inlet section 18 and central section 22, respectively, after assembly.

In order to join and secure the three sections 18, 20, and 22 together to form the complete housing 12, the four peripheral apertures 38, 42, and 84 of each section 18, 20, and 22 are lined up. A bolt 88, having threads 90 on its distal end 92, is then inserted through each set of four apertures 38, 42, and 84. The threads 90 of the bolt 88 engage with the threads 86 of the apertures 84 and, when tightened, thereby secure the three sections 18, 20, and 22 together to form the complete housing 12.

FIG. 2 illustrates the device 10 in its opened position where the disk 16 is maintained against the protruding end of the electromagnet 14 that is being energized by the control unit (not shown). When the disk 16 is in this opened position, flow paths, designated by the arrows A, exist through the device 10. Specifically, air entering the central inlet aperture 24 from the inlet conduit 28 flows over the beveled surface 30 and is fed into and through the apertures 48 spaced around the large central aperture 40 of the central section 20. The air flows through these apertures 48 and around the outer periphery of the disk 16, past the o-ring 74 and the beveled surface 78 into and through the outlet aperture 76 and into the outlet conduit 82.

In order to maintain the device 10 in its opened position, the electromagnet 14 must be strong enough to hold the disk 16 against the forward flow of air that contacts the small area around the periphery of the disk 16 exposed to the air flow path. However, since the contact area on the disk 16 is relatively small in this position, the corresponding holding force provided by the electromagnet 14 is also small.

To position the device 10 in its closed position, as illustrated in FIG. 3, the electromagnet 14 is merely deenergized which releases the disk 16 therefrom. The air flow can then propel the disk 16 forward across the recess 60 and against the o-ring 74 to seal off the flow path.

As was described earlier, as the disk 16 is propelled away from the electromagnet 14, its speed increases. This is because the air flow contacts a greater surface area of the disk 16 as the disk 16 travels across the recess 60. This increase in speed is gradual and provides a more smooth shut down of the pneumatic tool 11 without providing any abrupt motions to the pneumatic tool 11 and while still providing an instantaneous shut down of the pneumatic tool 11.

In operation, after the pneumatic tool 11 reaches a predetermined output specification, such as a desired torque if a rotational pneumatic tool is being used, a signal from the tool head is sent to the control unit that in turn deenergizes the electromagnet 14. The disk 16 is then forced against the o-ring 74 by the air flow to seal off the flow path and shutdown the pneumatic tool 11. At this point, pressure begins to build up from the air flow on the inlet side of the disk 16 facing the central section 20. A slight amount of air then begins to bleed through the aperture 68 in the disk 16 that, as described above, is slightly larger than the diameter of the pin 52. It is to be noted that this slight amount of air bleeding past the disk 16 is not enough to actuate and/or drive the pneumatic tool 11.

After the device 10 shuts off the flow of air to the pneumatic tool 11, the operator normally releases the actuating trigger 13 on the pneumatic tool 11 and repositions the pneumatic tool 11 for further use. Alternatively, if an automated pneumatic tool 11 is being used, a valve or similar device is closed within, or proximate to, the automated pneumatic tool 11. In either event, a shut off of the pneumatic tool 11 or within the outlet conduit 82 itself is provided at a position ahead of the device 10. Consequently, the air bleeding through the aperture 68 in the disk 16 relieves the pressure on the inlet side of the disk 16 by passing it through the aperture 68 along the pin 52 to the outlet side of the disk 16.

After a slight period of time, pressure builds up between the device 10 and the trigger 13 or valve of the pneumatic tool 11 until the pressure on both sides of the disk 16 virtually equalizes. Thereafter, the electromagnet 14 can be energized to attract and move the disk 16 into its opened position against the protruding portion of the electromagnet 14 to complete the cycle and enable the pneumatic tool 11 to operate. Accordingly, since the pressure is virtually equalized on both sides of the disk 16, the electromagnetic force required to move the disk 16, and consequently the size of the electromagnet 14, is significantly reduced.

A slight variation in the above described operation of the device 10 is also envisioned. After the disk 16 closes the air path, the electromagnet 14 can be energized but only to the minimum level necessary to attract the disk 16 under a no pressure situation. Accordingly, as soon as pressure is equalized on both sides of the disk 16, the disk 16 will be attracted by the electromagnet 14 and will open the air path.

It is to be understood that the above described operation of the device 10 occurs within a very short time interval. Consequently, there is virtually no dwell time necessary for the device 10 to complete its cycle before the pneumatic tool 11 is operable.

Figure 6:
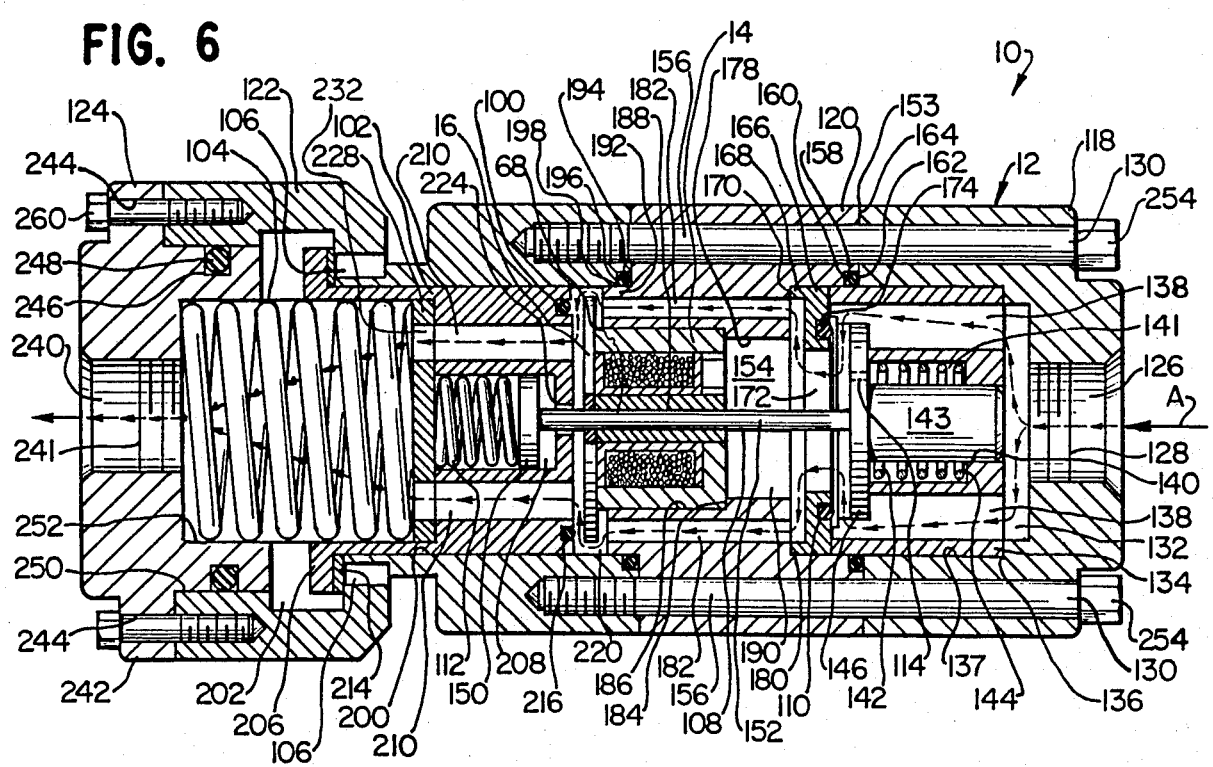
FIG. 6 illustrates a longitudinal cross-sectional view of a second embodiment of the device of the present invention in its opened position.
Figure 7:
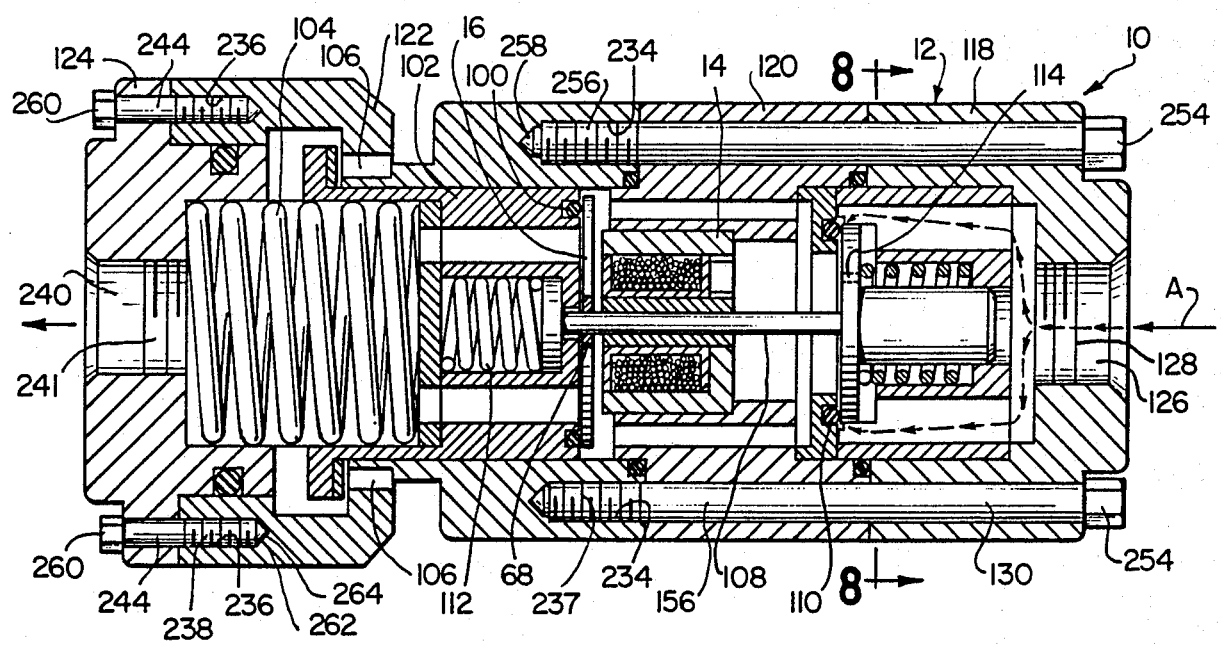
FIG. 7 illustrates a longitudinal cross-sectional view of the second embodiment of the device of the present invention in its closed position.
Figure 8:
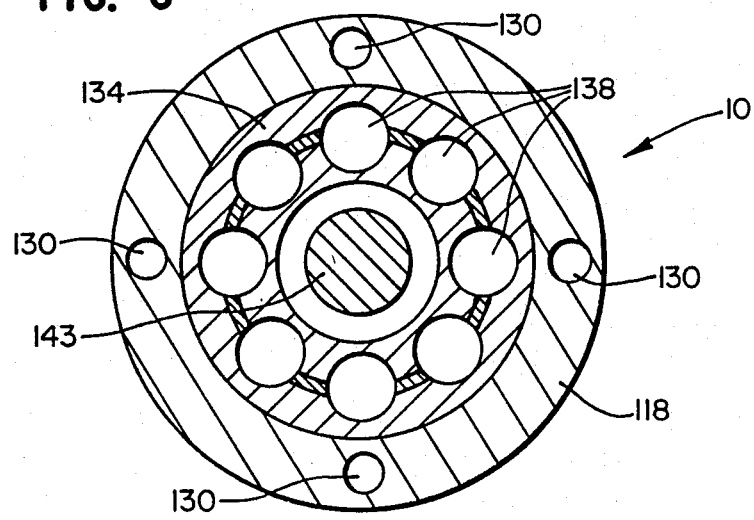
FIG. 8 illustrates a lateral cross-sectional view of the device of the present invention taken along lines 8—8 of FIG. 7.

FIGS. 6, 7, and 8 illustrate another embodiment of the device 10 of the present invention where common elements are referred to by the same numerals. In this embodiment, the device 10 includes the housing 12, the electromagnet 14 and the disk member 16. Preferably, the housing 12 is cylindrical in shape.

The device 10 of this embodiment is positioned along a length of conduit and can be positioned at a distance from the pneumatic tool 11. In this situation, in order to provide a precise shut down of the pneumatic tool 11 after the disk 16 closes the flow path through the device 10, the compressed air trapped between the device 10 and the pneumatic tool 11 must be evacuated. Otherwise, the trapped compressed air will continue to drive the pneumatic tool 11, thereby eliminating the precise shut down and the attainment of a particular specification to be achieved by the pneumatic tool 11.

Briefly, to exhaust the trapped compressed air, the device 10 in this embodiment automatically vents the trapped compressed air after the disk 16 closes the flow path. This is accomplished by a complex structural arrangement within the device 10 which will be broadly described at this point. A more detailed structural and operational description of the device 10 will be provided later.

When the device 10 is in its opened position as illustrated in FIG. 6, the compressed air flows through the device 10 along the path indicated by arrow A. To close the flow path, the electromagnet 14 is de-energized and the air flow pushes the disk 16 against an o-ring 100 secured within a movable internal sleeve 102. To exhaust the compressed air trapped between the device 10 and the pneumatic tool 11, the sleeve 102 moves longitudinally within the housing 12, propelled by the air flow, to the position indicated in FIG. 7. As FIG. 7 illustrates, as soon as the sleeve 102 begins to move, it compresses a large spring 104 and opens exhaust apertures 106 around the outer periphery of the housing 12.

Upon further movement of the sleeve 102, one end of a piston 108 is pulled longitudinally within the housing 12 by the sleeve 102. As the piston 108 is pulled, its other end contacts a second o-ring 110 and seals off the air pressure at a position in the device 10 before the disk 16. The piston 108 is held against the second o-ring 110 by the inward pressure of the air flow.

After the trapped compressed air is exhausted through the apertures 106, compressed air trapped between the disk 16 and the second o-ring 110 bleeds through the central aperture 68 of the disk and is likewise exhausted through the apertures 106. While this pressure is being released, as soon as it drops to a level not sufficient to hold the spring 104 compressed, the spring 104 begins to return the sleeve 102 to its original position, thereby closing the apertures 106. At the same time, the spring 104 compresses a second spring 112 against the piston 108 which is held immobile by the pressure generated by the air flow on its other end. The electromagnet 14 is now energized to retrieve the disk 16 to its original position to open the flow path through the o-ring 100.

At this point, the flow path is still sealed by the piston 108 against the second o-ring 110 and will remain sealed as long as the pressure between the second o-ring 110 and the pneumatic tool 11 remains significantly less than the pressure generated by the air flow. In order to re-open the flow path and return the device 10 to the position illustrated in FIG. 6, the air line ahead of the device 10 must be closed. This is typically accomplished by the operator of the pneumatic tool 11 who releases the trigger 13 of the pneumatic tool 11 after the device 10 cuts off the air flow.

A second bleed path 114 is formed as a small aperture through the piston 108 near the second o-ring 110. Until the trigger 13 closes the air line, the air bleeding through the piston 108 cannot drive the pneumatic tool 11 or return the piston 108 to its open position. However, after the trigger 13 is released on the pneumatic tool 11, pressure can build up between the second o-ring 110 and the pneumatic tool 11. When this pressure is sufficiently equalized with the air flow pressure holding the piston 108 closed, the second spring 112 can return the piston 108 to its initial open position and the cycle can be repeated. The pneumatic tool 11 is now operable.

As in the first embodiment, the device 10 can accomplish the above described movements within a very short time interval. Therefore, there is virtually no dwell time before the pneumatic tool 11 can be operated.

The structure of the device 10 will now be explained in greater detail with reference to FIGS. 6–8. The housing 12 includes four sections: an inlet section 118, a first intermediate section 120, a second intermediate section 122; and an outlet section 124. Each of the sections 118, 120, 122, and 124 is circular in cross-section and can be made from any desirable material, preferably metal. The securing and sealing of the four sections 118, 120, 122, and 124 is accomplished in a manner similar to that of the first embodiment and will be explained in greater detail later.

The inlet section 118 has a central inlet aperture 126. The aperture can have threads 128 that engage corresponding threads of the conduit 28 (illustrated in FIG. 1) that is to be secured to the inlet section 118.

As FIGS. 6 and 8 illustrate, to secure the inlet section 118 to the first intermediate section 120, a plurality of through apertures 130 are positioned around the periphery of the inlet section 118. Preferably, there are four apertures 130 spaced approximately 90° apart around the periphery of the inlet section 118. It is to be understood, however, that the number, size, and position of the apertures 130 can vary.

Within the interior of the inlet section 118, the inlet aperture 126 expands radially to form an enlarged cylindrical portion 132. The enlarged cylindrical portion 132 houses an internal sleeve member 134. To accommodate the internal sleeve member 134 and hold it in position after the device 10 is assembled, an annular shoulder 136 is formed within the enlarged cylindrical portion 132 by a second enlarged cylindrical portion 137.

To provide a flow path through the internal sleeve member 134, a plurality of apertures 138 are positioned around its periphery and extend through the internal sleeve member 134. As FIG. 8 illustrates, there are preferably eight apertures 138 that accept the flow of material directly from the inlet aperture 126 as illustrated by arrow A in FIG. 6.

The internal sleeve member 134 also includes a central through aperture 140. Positioned within a radially enlarged portion 141 of the central aperture 140 is a spring member 142 that surrounds a cylinder 143. The cylinder 143 is coupled to the piston 108. The spring member 142 provides a pre-load to the piston 108 to assist it in its movement and can be eliminated, if desired. One end of the spring member 142 abuts against a shoulder 144 formed by the enlarged portion 141 proximate the inlet side of the internal sleeve member 134. The other end of the spring member 142 abuts against a first end 146 of the piston member 108. The piston member 108 has a second end 150 and a central post member 152 that connects the first and second ends 146 and 150.

The first intermediate section 120 has one of its ends 153 positioned against the inlet section 118 and has a central aperture 154 that forms the flow path at the end 153 and accepts the air flow from the inlet section 118. To secure the sections 118 and 120 together, four peripheral apertures 156 extend longitudinally through the first intermediate section 120. When the device 10 is assembled, the apertures 156 line up with the apertures 130 of the inlet section 118.

To seal the first intermediate section 120 with respect to the inlet section 118, the first intermediate section 120 has a recessed portion 158 on its end 153 forming an annular shoulder 160 that accepts an o-ring 162. During assembly of the device 10, the o-ring 162 forms a seal between the recess 158 of the first intermediate section 120, an interior end 164 of the inlet section 118, and the internal sleeve member 134 of the inlet section 118 that protrudes slightly from the inlet section 118 and extends into the central aperture 154 of the first intermediate section 120.

To accommodate the second o-ring 110, an internal ring member 166 is positioned within the central aperture 154 of the first intermediate section 120 near the inlet section 118. The internal ring member 166 has an outwardly extending flange member 168 that abuts against an annular shoulder 170 formed within the central aperture 154 of the first intermediate section 120. When the device 10 is assembled, the internal ring member 166 is thus fitted between the shoulder 170 and the protruding portion of the internal sleeve member 134 of the inlet section 118.

To provide a flow path between the flow apertures 138 of the inlet section 118 and the central aperture 154 of the second intermediate section 120, the internal ring member 166 has a central aperture 172. An annular recess 174 is also formed in the ring member 166 facing the inlet section 118 that accepts the o-ring 110. The central aperture 172 forms part of the material flow path through the first intermediate section 120 a illustrated by the arrow A in FIG. 6. The o-ring 110, as described earlier, provides a seal between the first end 146 of the piston member 108 and the internal ring member 166 when the device 10 is in its closed position.

To form the flow path through the remainder of the first intermediate section 120, a reduced diameter portion 178 is formed within the central aperture 154 of the first intermediate section 120. The reduced diameter portion 178 forms an annular shoulder 180 around the interior of the central aperture 154 and includes a plurality of apertures 182. The apertures 182 extend through the first intermediate section 120 and form the flow path between the central aperture 172 of the internal ring 166 and the second intermediate section 122.

To secure the electromagnet 14 within the first intermediate section 120, the reduced diameter portion 178 of the central aperture 154 is formed with an internal annular shoulder 184 formed by an enlarged diameter portion 186. The enlarged diameter portion 186 houses the electromagnet 14 that abuts against the internal shoulder 184. In order to enable contact between the disk 16 and the electromagnet 14, the electromagnet 14 protrudes slightly away from the outlet end of the first intermediate section 120.

In order for the central post 152 of the piston 108 to extend through the first intermediate section 120, a central aperture 188 is formed through the electromagnet 14. The central aperture 188 accepts the central post 152 of the piston member 108 and is slightly larger than the outside diameter of the central post 152. The difference in size permits the central post 152 to move freely within the electromagnet 14, but is not large enough to accept any appreciable air flow. If desired, a gasket (not illustrated) can be used to seal off any gap between the central aperture 188 and the central post 152 but is not completely necessary since the air flow tends to follow the prescribed path through the first intermediate section 120 through the apertures 182. Furthermore, any air that may pass through the central aperture 188 will not interfere with the proper operation of the device 10.

As was described in the previous embodiment, the electromagnet 14 is connected to an external control (not shown) through wiring (not shown) that can extend through the first intermediate section 120 of the housing 12. To adhesively secure the electromagnet 14 within the enlarged diameter portion 186 of the central aperture 154 and to assist in providing a effective seal against material flow therethrough, the electromagnet 14 can be encapsulated, such as, for example, with an epoxy resin 190. The resin 190 can fill up the remaining portion of the reduced diameter portion 178 of the central aperture 154 to restrict material flow into the reduced diameter portion 178 and direct it toward the apertures 182. Additionally, any necessary electrical components (not shown) can be positioned within the remaining portion of the reduced diameter portion 178 and can be encapsulated with the resin 190. It is to be noted that the resin 190 does not cover or block the central aperture 188 of the electromagnet 14 and does not adhesively secure to the central post 152 so that the piston member 108 can be inserted in and be movable therethrough.

To provide a seal between the first and second intermediate sections 120 and 122, a reduced external diameter portion 192 is formed on the outlet side of the first intermediate section 120 to provide an annular shoulder 194 for an o-ring 196. The o-ring 196 encircles the reduced diameter portion 192. When the device 10 is assembled, the o-ring 196 is positioned against the annular shoulder lug on one side and a corresponding annular shoulder 198 formed in the second intermediate section 122 on its other side. Accordingly, this forms the seal between the first and second intermediate sections 120 and 122.

Additionally, when the device 10 is assembled, the reduced diameter portion 192 extends into a central aperture 200 of the second intermediate section 122. The central aperture 200 extends through the second intermediate portion 122 and is formed with an enlarged diameter portion 202 near the outlet section 124.

The central aperture 200 of the second intermediate section 122 houses the internal cylindrical sleeve member 102 and permits longitudinal movement of the sleeve member 102 therein. The internal sleeve member 102 has an outwardly extending flange member 206, a central chamber 208 and a plurality of flow apertures 210 positioned about the central chamber 208.

The internal sleeve member 102 moves between a first position, illustrated in FIG. 6, and a second position, illustrated in FIG. 7. When the internal sleeve member 102 is in its first position, its flange 206 seals off the apertures 106 positioned about the periphery of the second intermediate section 122. As described above, the apertures 106 provide an outlet for air to flow from the interior to the exterior of the device 10 when the internal sleeve member 102 is in its second position. To aid in sealing the apertures 106, the flange 206 can include an engagement member or gasket 214.

To secure the o-ring 100 to the sleeve member 102, an annular recess 216 is formed on the end of the internal sleeve member 106 proximate the first intermediate section 120. To house the disk 16, a chamber 220 is formed within the central aperture 200 of the second intermediate section 122. The chamber 220 is positioned between the o-ring 100 and the electromagnet 14. The chamber 220 enlarges axially when the internal sleeve member 102 moves between its first and second positions.

The central aperture 68 of the disk member 16 accepts the central post 152 of the piston member 108. Preferably, the disk member 16 is formed from a ferromagnetic material that can be attracted by the electromagnet 14. The disk member 16 is capable of moving longitudinally within the chamber 220 along the central post 152 of the piston member 108.

To provide a path for air to bleed past the disk 16 in its closed position, the central aperture 68 of the disk 16 is slightly larger than the external diameter of the central post 152 of the piston member 108 forming a slight gap therebetween. This gap permits air to bleed past the disk member 16. If desired, the central post 152 can be slightly tapered, having its smaller diameter end near the disk member 16.

The disk member 16 has a first opened position, illustrated in FIG. 6, and a second closed position, illustrated in FIG. 7. When the disk member 16 is in its first opened position, only a small portion of the outer periphery of the disk member 16 is exposed to the flow path, illustrated by arrow A. The disk member 16 is held in its first opened position by the electromagnet 14. When the disk member 16 is released by the electromagnet 14, it begins to move away from the electromagnet 14, due to the air flow which provides the necessary driving force. As the disk member 16 travels further across the chamber 220, the air flow can contact a greater surface area on the disk member 16 to increase its speed across the chamber 220. When the disk member 16 is in its second closed position, it contacts the o-ring 100 to seal off the material flow path.

The central chamber 208 within the internal sleeve member 102 has a central aperture 224 and houses the internal spring member 112. The central post 152 of the piston member 148 extends through the central aperture 224. The second end 150 of the piston member 108 is seated within the central chamber 208 and is biased by the internal spring member 112.

The central chamber 208 is sealed on its side opposite the central aperture 224 by a retaining disk 228. The retaining disk 228 is held in place by the spring 104. To provide the desired material flow path through the internal sleeve member 102 and the second intermediate section 122, the retaining disk 228 also includes flow apertures 232 that line up with the flow apertures 210 of the sleeve 102.

As FIG. 7 illustrates, to enable securing of the sections 118, 120, 122, and 124 of the housing 12 together, a plurality of peripheral apertures 234 are positioned around the end of the second intermediate section 122 proximate the first intermediate section 120. Similarly, a plurality of peripheral apertures 236 are positioned around the end of the second intermediated section 122 facing the outlet section 124. The apertures 234 and 236 only extend a predetermined distance longitudinally into the second intermediate section 122 and can be threaded with threads 237 and 238 respectively.

To form the flow path through the outlet section 124, the outlet section 124 has a central outlet aperture 240 having threads 241. To secure the outlet section 124 to the second intermediate section 122, an exterior peripheral flange 242 having a plurality of apertures 244 extending therethrough is formed around the outer periphery of the outlet section 124.

To provide a seal between the outlet section 124 and the second intermediate section 122, an annular recess 246 is formed around the outer periphery of the outlet section 124 having an o-ring 248 positioned therein. When the device 10 is assembled, the outlet section 124 extends within the interior of the second intermediate section 122 and the o-ring 248 contacts a reduced diameter portion 250 of the enlarged diameter portion 202 of the second intermediate section 122 to form the desired seal.

To house the end of the spring 104, the outlet aperture 240 of the outlet section 124 is enlarged on its interior end to form a receiving portion 252. Accordingly, the spring 104 is retained between the receiving portion 252 and the retaining disk 228.

To secure the inlet section 118, first intermediate section 120, and second intermediate section 122 together, the four peripheral apertures 130, 156, and 234 of each section 118, 120, and 122 respectively are aligned. A bolt 254, having threads 256 on its distal end 258, is then inserted through each set of four apertures 130, 156, and 234. The threads 256 of the bolt 254 engage with the threads 237 of the apertures 234 and, when tightened, secure the three sections 118, 120, and 122 together.

Similarly, to secure the outlet section 124 to the second intermediate section 122 and the other sections 118 and 120, the four peripheral apertures 244 of the outlet section 124 are aligned with the four apertures 236 of the second intermediate section 122. A bolt 260, having threads 262 on its distal end 264, is then inserted through each set of four apertures 244 and 236. The threads 262 of the bolt 260 engage with the threads 238 of the apertures 236 and, when tightened, secure the outlet section 124 to the second intermediate section 122 to form the completed housing 12.

The operation of the device 10 will now be explained in greater detail. The device 10 is positioned along the length of a conduit and has an inlet conduit 28 and an outlet conduit 82, as illustrated in FIG. 1. Typically, threaded ends of the conduits 28 and 82 engage with the threads 128 and 241 of the inlet aperture 126 and the outlet aperture 240 of the housing 12 respectively. Thereafter, air can flow through the device 10 in the direction of arrow A from the inlet conduit 28 to the outlet conduit 82. Normally, the device 10 is positioned near a pneumatic tool 11 whose action is to be controlled. In this embodiment, the distance between the pneumatic tool 11 and the device 10 is not relevant and can be quite large if necessary.

Referring now to FIGS. 6 and 7, when the pneumatic tool 11 attains a desired output, such as a desired rotational torque, a control system (not shown) de-energizes the electromagnet 14 that is holding the disk 16 in its opened position against the force exerted by the forward flow of air around the outer periphery of the disk 16. Accordingly, the disk 16 is propelled across the chamber 220 by the air flow and seals against the o-ring 100 to close the flow path through the device 10 and to shut down the pneumatic tool 11.

Immediately after contacting the o-ring 100, the disk 16, propelled by the air flow, begins to push the internal sleeve 102 in the second intermediate section 122 toward the outlet section 124. As the internal sleeve 102 moves, its flange 206 opens the apertures 106 on the second intermediate section 122. At the same time, the internal sleeve 102 compresses the spring 104 through the retaining ring 228 and pulls the second end 150 of the piston member 108 toward the outlet section 124. This in turn pulls the first end 146 of the piston member 108 against the o-ring 110 to seal off the flow path through the device 10 at a position behind the disk member 16.

Accordingly, any pressure ahead of the disk member 16, either within the device 10 or within the outlet conduit 82 between the device 10 and the pneumatic tool 11, is exhausted through the apertures 106 to the exterior of the device 10. This provides the desired precise shut down of the pneumatic tool 11 without allowing any excess pressure between the device 10 and the pneumatic tool 11 from continuing to drive the pneumatic tool 11. The precise shut down of the pneumatic tool 11 can thus be achieved, even if the device 10 is positioned at a great distance from the pneumatic tool 11.

All of the above described movements of the device 10 occur very quickly in order to obtain the desired result. In use, the operator of the pneumatic tool 11, upon realizing that the pneumatic tool 11 has been shut down, typically releases the trigger 13 of the pneumatic tool 11 to close off the conduit at a position ahead of the device 10. Alternatively, if an automated pneumatic tool 11 is being used, a valve or similar device is closed within, or proximate to, the pneumatic tool 11. In any event, when the device 10 attains its closed position as illustrated in FIG. 7, the material pressure built up between the disk member 16 and the first end 146 of the piston member 108 can bleed through the slight gap that exists between the central aperture 68 of the disk member 16 and the outside diameter of the central post 152 of the piston member 108. The material that bleeds through the aperture 68 of the disk member 16 is exhausted through the apertures 106 of the second intermediate section 122 and does not provide any driving force to the pneumatic tool 11.

After exhausting the material pressure from the inlet side of the disk member 16, the disk member 16 is no longer positively maintained against the o-ring 100 by the air pressure. Accordingly, the electromagnet 14 can then be activated to move the disk member 16 back across the chamber 220 to its first opened position with little or no resistance. It is to be noted that the electromagnet 14 can accomplish this with a minimum amount of energy since there is no pressure acting on the disk member 16 to restrict its movement. The electromagnet 14 must only be capable of moving the weight of the disk member 16 and overcoming any slight amounts of friction that may be encountered as the disk member 16 moves across the chamber 220.

Simultaneously, as the pressure is relieved from the inlet side of the disk member 16, the spring 104 returns the internal sleeve 102 back to its closed position, thereby closing the apertures 106. At the same time, the spring 112 within the central chamber 208 of the internal sleeve 102 is compressed since the internal sleeve 102 is being driven toward the disk member 16 and the piston member 108 is held in position by the flow of material against the first end 146 and the cylinder 143 of the piston 108.

Meanwhile, air can bleed past the seal between the first end 146 of the piston member 108 and the o-ring 110 through the bleed path 114. This allows air under pressure to enter the first intermediate section 120 as well as the second intermediate section 122, the outlet section 124 and the outlet conduit 82 between the device 10 and the pneumatic tool 11. If the trigger 13 of the pneumatic tool has not been released by the operator, this air pressure is not enough to cause the pneumatic tool 11 to be activated. Additionally, the device 10 will remain closed at the o-ring 110 until the outlet conduit 82 is closed ahead of the device 10 by the trigger 13, for example.

When the operator releases the trigger 13 of the pneumatic tool 11, however, the material bleeding past the first end 146 of the piston member 108 begins to build up pressure again in both the outlet conduit 82 and the device 10 ahead of the first end 146 of the piston member 108. When the pressure becomes relatively equalized on both sides of the first end 146 of the piston member 108, the spring 112 within the interior of the chamber 208 of the internal sleeve 102 can overcome the force of the pre-load spring 142 of the internal sleeve 134 of the inlet section 118 to reopen the seal between the first end 146 of the piston member 108 and the o-ring 110. Accordingly, the device 10 is returned to its original opened position as illustrated in FIG. 6 and can be activated to repeat the cycle.

Modifications and variations of the present invention are possible in light of the above teachings. A specific dimension or construction is not required so long as the assembled device is able to function as herein described. It is therefore to be understood that within the scope of the appended claims, the invention may be practiced otherwise than as specifically described.

What is claimed and desired to be secured by letters patent of the United States is:

1. A control valve device comprising:
    a housing having a material flow path therethrough, said housing having a first inlet end and a second outlet end;
    a valve seat formed within said housing near said second outlet end of said housing and having said material flow path therethrough;
    a disk member positioned within said material flow path through said housing having a first position against said valve seat that closes said material flow path through said housing and a second position spaced a predetermined distance away from said valve seat that opens said material flow path through said housing;
    first means for moving said disk member within said housing said first means for moving being capable of moving said disk member to said first position against said valve seat and maintaining said disk member in said first position;
    means for bleeding material from said first inlet end of said housing past said disk member in said first position to said second outlet end of said housing; and
    second means for moving said disk member within said housing second means for moving including an electromagnet positioned within said housing capable of moving said disk member from said first position to said second position and maintaining said disk member in said second position wherein said material flow path is established around said electromagnet and a peripheral edge of said disk member and said electromagnet maintains said disk member in said second position against the flow of material and the material can flow around said electromagnet and said disk member through said valve seat and out of said second outlet end of said valve device.

2. The device as defined in claim 1, wherein said first means for moving is established by said material flow path through said valve device that contacts said peripheral edge of said disk member and moves said disk member to said first position against said valve seat upon de-energization of said electromagnet.

3. The device as defined in claim 2, wherein said disk member includes a central aperture therethrough and said housing includes a pin member secured within its interior within said material flow path between said electromagnet and said valve seat, said pin member extending through said central aperture of said disk member to form a central axis for said disk member to move along from said first position to said second position.

4. The device as defined in claim 3, wherein said central aperture of said disk member is slightly larger than the diameter of said pin member so that a slight gap is formed between said pin member and said central aperture of said disk member and said gap forms said means for bleeding when said disk member is in said first position.

5. The device as defined in claim 3, wherein said pin member is slightly tapered, having its smallest diameter at its end proximate said valve seat.

6. The device as defined in claim 5, including means for blocking said material flow path ahead of said valve device so that after closing said material flow path by said disk member, said means for blocking can block said material flow path ahead of said valve device and material bleeding through said valve device can develop a material pressure between said valve device and said means for blocking that substantially equalizes the material pressure behind said valve device and said disk member can be moved without being affected by any substantial material pressure.

7. An air valve for shutting off the flow of compressed air through a conduit comprising:
   a cylindrical housing having a longitudinal flow path therethrough, said housing having a first inlet end and a second outlet end and being in communication with the flow of compressed air;
   an annular flange formed within said housing to form a valve seat along said flow path near said second outlet end of said housing facing said inlet end of said housing and having said flow path extending therethrough;
   a disk member positioned within said flow path through said housing having a first position against said annular flange on the side of said annular flange facing said first inlet end of said housing that closes said flow path through said housing, and a second position spaced a longitudinal predetermined distance away from said flange toward said first inlet end of said housing that opens said flow path through said housing, said disk member having a central aperture extending therethrough;
   an electromagnet means for positioning and maintaining said disk member in said second position when said electromagnet means is energized, said electromagnet means being secured within said housing proximate the side of said disk member facing said first inlet end of said housing when said disk member is in said second position, said electromagnet means including means for allowing air to flow around it to contact said disk member when said disk member is in its first or second position so that when said disk member is in its second position, air can flow around said electromagnet means and said disk member and through said housing, and said electromagnet means can be de-energized to enable said air flow to move said disk member to said first position against said flange and air can flow around said electromagnet means and retain said disk member against said flange; and
   a tapered pin member extending through said central aperture of said disk member, said tapered pin member having its larger diameter end secured to said electromagnet and extending outwardly therefrom toward said outlet end of said housing so that said tapered pin can permit a slight amount of air to bleed past said disk member when said disk member is in said first position to equalize air pressure on both sides of said disk member and said electromagnet can move said disk member from said first position to said second position with a minimum amount of force.

* * * * *

UNITED STATES PATENT AND TRADEMARK OFFICE
CERTIFICATE OF CORRECTION

PATENT NO. : 4,925,155

DATED : May 15, 1990

INVENTOR(S) : Charles H. Carman

It is certified that error appears in the above-identified patent and that said Letters Patent is hereby corrected as shown below:

```
Column  1, line 20, delete "slop" and insert --stop--;

Column 11, line 10, delete "a" and insert --as--;
Column 11, line 57, delete "a" and insert --an--;
Column 12, line 12, delete "lug" and insert --194--; and
Column 16, line 34, after "housing" insert --said--.
```

Signed and Sealed this

Sixth Day of August, 1991

Attest:

HARRY F. MANBECK, JR.

*Attesting Officer*   Commissioner of Patents and Trademarks